March 18, 1941.  C. B. HARRIS  2,235,427
UNIVERSAL DRIVE
Filed June 19, 1940

INVENTOR
CLIFFORD B. HARRIS
BY
ATTORNEY

Patented Mar. 18, 1941

2,235,427

UNITED STATES PATENT OFFICE 2,235,427

UNIVERSAL DRIVE

Clifford B. Harris, Weehawken, N. J., assignor to Condenser Service & Engineering Co., Inc., Hoboken, N. J., a corporation of New Jersey Application June 19, 1940, Serial No. 341,226

6 Claims. (Cl. 74—385)

This invention relates to what might be termed drives or couplings, and particularly to the universally adjustable drives or couplings of this type and kind, adapting the same for innumerable uses; and the object of the invention is to provide a drive comprising two similar or substantially similar casing parts, each supporting a shaft member upon which is disposed a gear with means for coupling the two casing parts together with an intermediate gear disposed within and between the casing parts meshing with said shaft gears to place both shafts in direct operative engagement with each other, the casing parts being adjustable 360° to each other in providing full universal adjustment between the drive shaft and the driven shaft of the device; a further object being to provide a device of the class described wherein a frictional drive may be provided between the drive and the driven shafts, and further wherein a single drive shaft may actuate two or more driven shafts disposed in any desired relationship to each other and to the drive shaft; a still further object being to provide means for substantially sealing the casing parts and further to provide means for keying the casing parts against relative rotation to maintain fixed adjustments of the shafts one with respect to the other; a still further object being to provide means for supporting each of the casing parts in connection with a predetermined support or supports; and with these and other objects in view, the invention consists in a drive of the class and for the purpose specified, which is simple in construction and operation, efficient in use, and which is constructed as hereinafter more fully described and claimed.

The invention is fully disclosed in the following specification, of which the accompanying drawing forms a part, in which the separate parts of my improvement are designated by suitable reference characters in each of the views; and in which.

In referring to my improved device as a universal drive or coupling, it will be understood that this drive may be utilized in constant and intermittent power drives, and also as a means for transmitting rotary movement from one point to another point in the construction of reach rods, extension shafts, remote valve controls, and many other uses and installations of this type and kind, as well as in providing a drive between two or more shafts angularly adjustable one with respect to the other; and in fact, adjustable within 360° to each other. By mounting the casings of the drive in different angular positions; that is to say, with the axis of rotation of the casings disposed vertically, horizontally, or at any desired angle, it is possible to provide a drive between two shafts disposed at substantially any angle to each other.

In certain adaptations of the invention the drive shaft may transmit power output to two driven shafts having a fixed relationship to each other governed by the particular arrangement and structure of the casing part in which the two driven shafts are arranged. At this time it will also be apparent that in referring to drive shafts, it will be understood that these shafts may be of any desired construction; and in some instances, the universal drive may be employed between two mechanisms where the shaft factor is only incidental to the support of members to be driven and not necessarily long reaching shafts as more conventionally used in couplings of the general type and kind under consideration.

Figure 1:
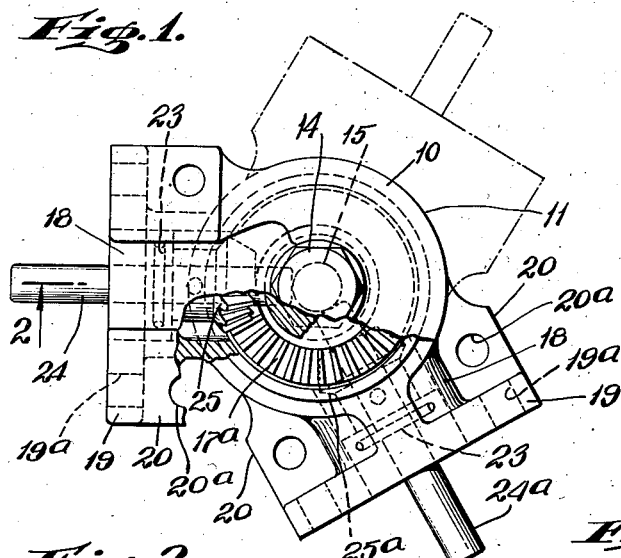
Fig. 1 is a plan and sectional view of one form of device made according to my invention.
Figure 2:
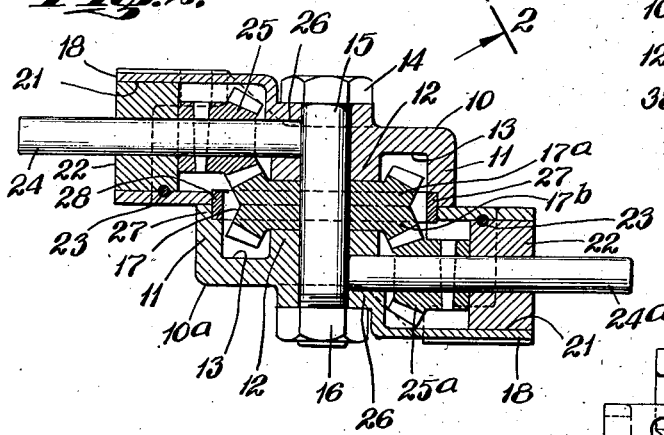
Fig. 2 is a section substantially on the line 2—2 of Fig. 1.

In the construction shown in Figs. 1 and 2, I provide two substantially similar casing parts 10, 10a, and these parts are of identical construction. Therefore, the brief description of one will apply to both. Each casing part comprises a substantially cup-shaped body 11 having a central bearing portion 12 around which is a gear chamber 13. The bearing portion 12 extends beyond the outer surface of the cup-shaped part proper to form a seat for the head 14 of a bolt 15 as well as a nut 16 at the other end thereof. This bolt is utilized to couple the two casing parts together as well as to form an axis upon which a duplex beveled gear 17 is rotatably mounted.

In the construction shown, the gear 17 comprises two beveled gears 17a, 17b, which are welded or otherwise secured together, thus gears of stock construction can be used. It will be apparent, however, that specially constructed gears of this type and kind may be employed.

Extending laterally from one side of the cup-shaped casing part 11 is a large bearing portion 18 terminating in its outer face in a vertical flange 19 which is of greater width than the bearing 18 and has angularly extending web or flange portions 20 united with the cup-shaped casing 11 as clearly indicated in Fig. 1 of the drawing.

The flanges 19 and 20 have apertures 19a and 20a to receive bolts or other fastening devices in providing different attachments of the casings to one or more supports as will be apparent. The bearings 18 are provided with large bores or passages 21, note Fig. 2, in which are keyed bushings or bearing members 22 as seen at 23 which form supports for two shafts 24, 24a, one of which will constitute a drive shaft and the other a driven shaft, as well as to retain beveled pinions 25, 25a, against outward displacement from the casings in maintaining alinement of these pinions with the beveled gears 17a, 17b, respectively. It will also appear that the inner ends of the shafts 24, 24a have supports in the bearing portions 12 as is indicated at 26.

It will further appear from the foregoing that the shafts, including the beveled pinions, will constitute integral parts of each of the similar casings; and in separating these casings the beveled gear 17 may be freely detached from either of the casing parts; it being thus apparent that assemblage and disassemblage of the parts is materially simplified. Adjacent surfaces of the cup-shaped parts 11 are provided with grooves 27 in which are arranged a key and sealing ring 28 which serves to maintain alinement of the casing parts as well as to seal abutting surfaces of the casing parts, thereby making it possible to pack the chambers 13 with lubricant. If desired, conventional stuffing boxes may be employed between the bearings 22 and the shafts 24, 24a, as will be apparent. With the structure shown in Fig. 1, it will be apparent that the casing part 10a may be adjusted with respect to the casing part 10 throughout the entire circumference of the axis 15. In other words, this adjustment may be from a position of the shafts 24, 24a parallel and one above the other extending in the same direction to any other position; for example, the angular position illustrated in Fig. 1.

Due to the irregular section line, the illustration in Fig. 2 gives the effect of 180° adjustment, which is one of many possible adjustments. It will, of course, be apparent that either shaft 24, 24a, may be the relatively fixed shaft and the other, including its casing part, adjustable with respect to it. Furthermore, instead of arranging the parts with the shafts in horizontal position as viewed in the drawing, these shafts may be disposed vertically or at any desired angle or inclination. Where supports are provided for rigidity at the coupling, these supports may be coupled to the apertured flange portions as will be apparent.

In some instances, particularly where a driven shaft, or even the drive shaft, is subject to oscillation, the casing supporting this shaft will be left free to oscillate around the axis 15 as will be apparent. It is also possible that in some instances, oscillatory movement would be desirable between both shafts, in which event means will be provided for yieldably or otherwise supporting, and if necessary, guiding the axis 15.

It will also be apparent that my invention is by no means restricted to any type of drive between the shafts as this may be varied to suit different types and kinds of installations.

Figure 3:
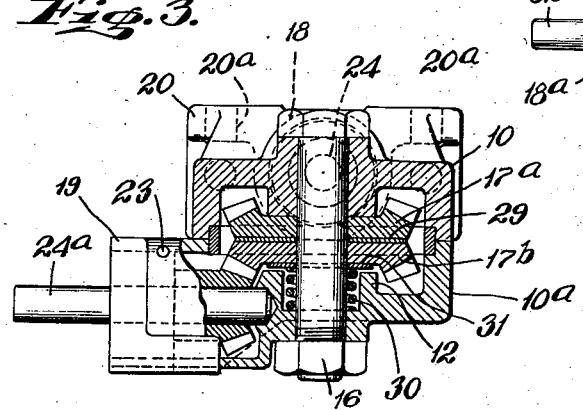
Fig. 3 is a sectional view through a modified form of device showing parts in a different position and showing a frictional drive.

For example, in Fig. 3 of the drawing, one simple method of forming a friction drive between a structure which is substantially identical to the structure shown in Figs. 1 and 2, will reside in maintaining the beveled gear members 17a, 17b, unattached with respect to each other and disposing a friction disc or ring 29 between adjacent surfaces of said gears, and in enlarging slightly upon one of the bearings 12 to form a seat and socket for a coil spring 30 bearing against a washer 31 to urge the gears 17a, 17b in constant engagement with each other. In this construction the shafts 24 and 24a are shown arranged in a different angular position to each other, but otherwise the structure in Fig. 3 is substantially similar to that shown in Figs. 1 and 2, bearing in mind that the casing part 10a is of slightly different construction from that shown in the other figures, whereas the casing part 10 would be identical with the part 10 shown in said other figures.

Figure 4:
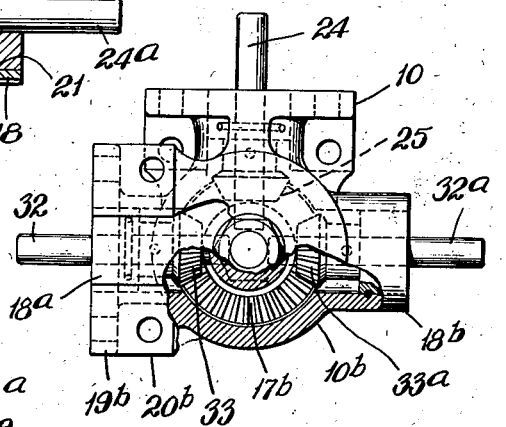
Fig. 4 is a view similar to Fig. 1 showing another modification.

In Fig. 4 of the drawing is shown another adaptation of the invention; and in this figure 10 represents a casing part similar in all respects to the part 10 in Figs. 1 and 2, including the shaft 12 and the other parts. The beveled gear is indicated in dotted lines at 25. At 10b is shown a modified form of casing having two oppositely extending bearing portions 18a and 18b; the bearing portion 18a including the flanges 19b, 20b, similar to the flanges 19 and 20, whereas the bearing portion 18b is unflanged. Arranged in the bearing 18a is one driven shaft 32 having a beveled pinion 33 meshing with the beveled gear part 17b, which is identical to the part 17b of Figs. 1 and 2, or to the corresponding part shown in Fig. 3.

At 32a is shown a supplemental driven shaft, arranged in the bearing portion 18b and having a beveled pinion 33a also operating upon the gear part 17b. It will thus be apparent that from the drive shaft as at 24, two outputs or driven shafts 32, 32a, disposed in alinement with each other may be simultaneously driven. In the present construction both of the shafts 32, 32a, and the gears 33, 33a are of the same construction, but it will be apparent that different size gears and different size shafts may be provided. Furthermore, it will be understood that the two shafts may be disposed in different angular relationships to each other to suit predetermined requirements. Thus it will only be necessary to produce casing parts 10b, universally usable on casing parts like 10, in accommodating different types and kinds of installations or drive. In many instances the various parts will be standardized in order to maintain low manufacturing costs.

At this time it is well to mention that the universal coupling drive may be constructed on a very small scale as well as on large scales; and in the different uses, various types of driving mediums between the shafts may be employed. It will further be understood that in many instances the casing parts may be of a special construction, and this would be particularly true when a large number of such parts are constructed to meet one specification in predetermined installations.

Figure 5:
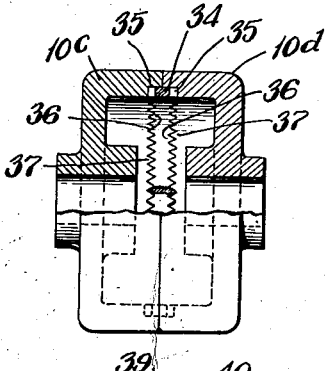
Fig. 5 is a sectional view through two casing parts omitting the shafts and gears illustrating a method of adjustably coupling the case parts; and, Fig. 6 is a view similar to Fig. 5 showing another modification.

In Fig. 5 of the drawing I have diagrammatically illustrated one method of adjustably keying the casing parts one with respect to the other to prevent relative movement between these parts and to provide relatively fine adjustments throughout the entire 360° of relative adjustment between the casing parts. In Fig. 5 two casing parts 10c and 10d are shown, all of the mechanism associated therewith being omitted with the exception of the key and sealing ring 34, which is arranged in the grooved portions 35 on abutting surfaces of the casing parts. In the present construction, the ring 34 has laterally projecting and circumferentially spaced teeth 36 engaging corresponding teeth 37 in the grooves 35. In this way both casing parts may have a fine adjustment with respect to the ring in maintaining the shafts in distinct angular relationship to each other. It will, of course, be apparent that in some instances, one side of the ring 34 may be just keyed to one casing, and the other casing will have teeth registering with corresponding teeth on the other side of the ring. However, when both casing parts are of identical construction, the double-tooth ring shown is desirable. In other instances, where limited and predetermined adjustments are desirable between the two casing parts, these adjustments may be accomplished by other keying means as will be apparent.

Figure 6:
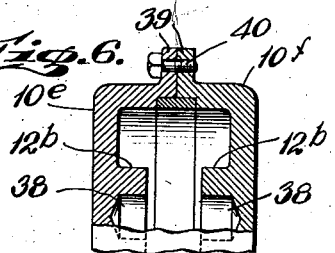

In Fig. 6 of the drawing is illustrated at 10e and 10f portions of two other casing parts which differentiate from the structure shown in the other figures primarily in dispensing with the axis 15 as a bolt and coupling between the casing parts and in providing sockets 38 in the bearing portions 12b for receiving the ends of a stub shaft arranged between the casing parts forming an axis similar to the bolt axis 15 and in providing circumferentially spaced lugs 39 on the casing parts 10e, 10f, to receive clamping or coupling screws 40 for securing the casing parts together. These screws may be passed through coupling flanges with a predetermined spacing of apertures to provide certain adjustments between the casing parts. This type of construction, however, would be more suitable for the highly standardized arrangements between drive and driven shafts.

It will also be apparent that in the several forms of construction shown in Figs. 1 to 5 inclusive that the axis upon which the beveled gears 17a, 17b are arranged may form a positive driving axis with at least one of these gears by simply keying the gear to the axis. Thus this axis may be utilized as a driving means for the laterally extending shafts in providing two or more angularly disposed outputs in the form of driven shafts. It will also be apparent that in the several illustrations disclosed, suitable bearings are provided and such bearings are omitted in order to simplify the present illustrations. The use of special bearings would only be desirable in the constant drives. Where intermittent drives are employed and where the invention is applicable to reach rods, valve operating rods, and the like, the question of bearings is not an important factor except in providing ease of operation and in reducing frictional engagement.

Having fully described my invention, what I claim as new and desire to secure by Letters Patent, is:

1. A universal drive of the class described comprising two cup-shaped casing parts of substantially similar construction, a radially extending bearing on each casing part, other bearings centrally of said parts, a shaft mounted in both bearings of each part, a beveled pinion on said shaft within the casing part, means coupling the casing parts together to form a large chamber centrally thereof into which the beveled pinions of each shaft extends, a dual beveled gear arranged in said chamber and operatively engaging said pinions in providing positive driving connection between said shafts, and means adjustably coupling said casing parts with respect to the axis of said dual beveled gear in providing different angular relationships of the shafts one with respect to the other while maintaining drive connection between said shafts through said dual beveled gear.

2. A coupling of the class described comprising two casing parts, means detachably and adjustably coupling said parts, each part having a central hub portion for the axis of rotary adjustment of the parts one with respect to the other, each casing having a radial tubular extension, a shaft for mounting in each casing part to form of one shaft a drive shaft and the other a driven shaft, means in the hub portion and tubular extension of each part forming a bearing for the shaft arranged therein, means within the casing parts when assembled forming a drive connection between the drive shaft and the driven shaft, one of said casing parts having another tubular extension arranged angularly with respect to the first extension thereof, a shaft having a bearing in said last named extension and the hub portion of said casing part, and means establishing driving connection between the last named shaft and said first mentioned shafts.

3. A coupling of the class described comprising a drive shaft and a driven shaft, a driving means on said shafts, means independently supporting said shafts and for coupling adjacent ends of the shafts to provide circumferential adjustment about an intermediate axis through 360° with respect to each other, means located on said axis providing and maintaining a driving connection between the driving means on said shafts throughout the entire range of relative adjustment between said shafts and said last named means comprising means forming a friction drive between said driving means.

4. A universal drive of the class described comprising two substantially similar hollow casing parts, each casing part having a central apertured hub portion extending into the chamber of said part, a bolt arranged in said hub portions for coupling said parts together and to form an axis for rotary adjustment of the parts one with respect to the other, said hub portions providing bearings, each casing part having an outwardly and radially extending tubular portion with a bearing mounted in said tubular portion, a shaft arranged in both bearings of each casing part, a gear on each shaft within its casing part, a double gear on said axis and within the chamber of the casing parts operatively engaging both of the first named gears for placing said shafts in operative connection with each other, and means including said axis for adjustably coupling the casing parts to dispose the shafts thereof in different positions of adjustment one with respect to the other while maintaining driving connections between said shafts.

5. A universal drive of the class described comprising two substantially similar cup-shaped casing parts, each part having a tubular hub portion forming a central bearing and an outwardly projecting radial tubular portion, a shaft arranged in each casing part, the inner end of the shaft fitting in a radial aperture formed in the hub portion and in a bearing arranged in said radial tubular portion, a gear on the shaft within the casing part and inwardly of said bearing, means arranged in the hub portion of the casing parts for detachably coupling said casing parts, said last named means forming a central axis, a double-faced gear arranged on said axis and in operative connection with the gears on said shafts for placing said shafts in direct operative connection with each other, the outside dimensions of the gears on said shafts being less than the inside dimensions of said tubular extension whereby the gears assembled on the shafts may be inserted into and out of the casing parts through said tubular extension, and means detachably coupling the bearings of said extension and for keying the same thereto.

6. A universal drive of the class described comprising two substantially similar hollow casing parts, each casing part having a central apertured hub portion extending into the chamber of said part, a bolt arranged in said hub portions for coupling said parts together and to form an axis for rotary adjustment of the parts one with respect to the other, said hub portions providing bearings, each casing part having an outwardly and radially extending tubular portion with a bearing mounted in said tubular portion, a shaft arranged in both bearings of each casing part, a gear on each shaft within its casing part, a double gear on said axis and within the chamber of the casing parts operatively engaging both of the first named gears for placing said shafts in operative connection with each other, means including said axis for adjustably coupling the casing parts to dispose the shafts thereof in different positions of adjustment one with respect to the other while maintaining driving connections between said shafts, and mounting flanges on said casing parts for independently supporting each casing part in different positions of adjustment thereof.

CLIFFORD B. HARRIS.